United States Patent [19]
Irwin et al.

[11] Patent Number: 4,609,340
[45] Date of Patent: Sep. 2, 1986

[54] ACCUMULATOR HEAD WITH DIVERTER SLEEVE

[75] Inventors: Christopher Irwin, Adrian; Rudolf H. Poehlsen, Tecumseh, both of Mich.

[73] Assignee: Hoover Universal, Inc., Ann Arbor, Mich.

[21] Appl. No.: 768,585

[22] Filed: Aug. 23, 1985

[51] Int. Cl.$^4$ .................. B29C 49/04; B29C 47/20
[52] U.S. Cl. .................. 425/532; 425/376 R
[58] Field of Search ............ 425/532, 72 R, 132, 425/133.1, 376 R, 380, 381; 264/514

[56] References Cited

U.S. PATENT DOCUMENTS

| | | | |
|---|---|---|---|
| 4,165,212 | 8/1979 | Ziegler | 425/532 |
| 4,297,092 | 10/1981 | Goron | 425/532 |
| 4,302,170 | 11/1981 | Goron | 425/532 |
| 4,323,340 | 4/1982 | Uhlig | 425/532 |
| 4,422,838 | 12/1983 | Iwaki et al. | 425/532 |
| 4,424,178 | 1/1984 | Daubenbüchel et al. | 425/532 |
| 4,563,147 | 1/1986 | Langecker | 425/532 |

Primary Examiner—Willard E. Hoag
Attorney, Agent, or Firm—Stephenson and Boller

[57] ABSTRACT

An accumulator head for blow molding machines having a diverter sleeve that cooperates with other components in the head to form annular concentric flow paths for plastic material between the inlet and outlet of the diverter sleeve to divide the plastic material into two arcuate paths which subsequently meet and split into two more arcuate paths in which plastic material flows in a reverse direction relative to the first two paths and is directed to the diverter outlet. The diverter sleeve thus insures intimate mixing of the plastic material and eliminates the likelihood of a weld line in the plastic material. In addition, the diverter sleeve is mounted for up and down movement with respect to the inlet for plastic material to thereby eliminate dead points in the plastic flow path and facilitate changeover from one material to another in the head.

3 Claims, 4 Drawing Figures

4,609,340

ACCUMULATOR HEAD WITH DIVERTER SLEEVE

BACKGROUND OF THE INVENTION

This invention relates generally to blow molding machines and more particularly to an extrusion head that has an accumulation chamber therein from which thermoplastic material can be discharged intermittently.

Two significant problems presently exist in extrusion heads of the accumulator type, namely, the problem of eliminating the undesirable weld line which occurs in the head when the plastic from the extruder flows in two different paths around the mandrel and comes together to form the melt weld line. The second problem is the problem of down time during changeover of the accumulator head from one color or plastic to another. Present heads pose the continual threat of dead spaces which must be individually purged of residual plastic material before a color change can be effected.

The principal object of this invention, therefore, is to provide an improved accumulator head which embodies solutions to the above described problems.

SUMMARY OF THE INVENTION

In the accumulation head of this invention, split or overlapping flow characteristics are imparted to the plastic material flowing into the accumulation chamber in the head so as to minimize or eliminate the melt weld line which often results when using certain plastic material. This is accomplished by the provision of a diverter sleeve positioned in the head at the inlet for plastic material from the extruder in a position in which the diverter sleeve cooperates with the accumulation piston and the die body to form the split and overlapping flow paths that eliminate weld lines.

The diverter sleeve has radially aligned inner and outer recessed channels which are connected by a port disposed diametrically opposite the inlet to the sleeve from the extruder. As a result, plastic enters the outer channel from the extruder and is immediately divided into two arcuate paths which meet at the connecting port and flow therethrough into the inner channel for subsequent flow in reversely flowing split paths to the outlet for the diverter sleeve.

The diverter sleeve is also mounted for adjustable and up and down movement relative to the inlet from the extruder to eliminate dead points in the plastic flow path in the head. This faciliates changeover of the head from one color or plastic material to another without extensive down time.

The result is an improved accumulator head which enables the production of higher quality products with less down time of the head during changeover from one plastic material to another.

Further objects, features and advantages of the invention will become apparent from a consideration of the following description and the appended claims when taken in connection with the accompanying drawing in which:

Figure 1:
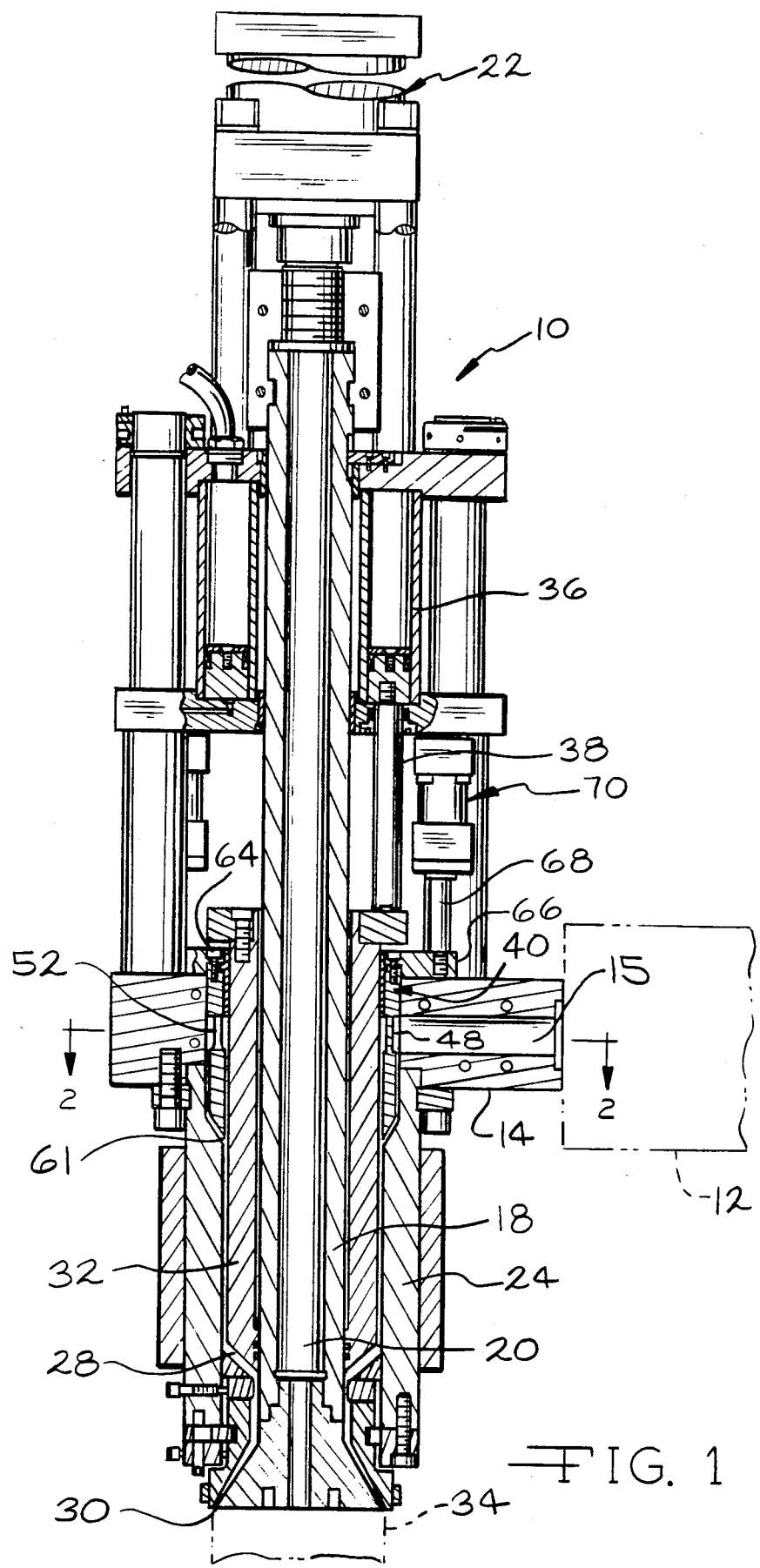
FIG. 1 is a vertical sectional view of the accumulator head of this invention showing the accumulator piston in its extended position.

With reference to the drawing, the accumulator head of this invention, indicated generally at 10, is shown in FIG. 1 connected to a conventional extruder 12 by an inlet body member 14. The extruder 12 provides a continuous flow of molten thermoplastic material to the extrusion head 10 through an inlet passage 15 in the body member 14.

The extrusion head 10 includes a die mandrel 18 that has an air conduit 20 extending axially therethrough to a conventional blow pin (not shown) and the mandrel 18 is connected at its upper end to an adjustment cylinder 22 capable of moving the mandrel 18 in up and down directions.

A die body 24 is supported in spaced relation around the die mandrel 18 so as to define therewith in series an annular inlet orifice 26, an annular accumulation chamber 28 (FIG. 3) and an annular outlet orifice 30. The piston 32 is slidably mounted on the mandrel 18 for up and down movement between the extended position shown in FIG. 1 and the retracted position shown in FIG. 3. When the annular piston 32 is moved downwardly from its retracted position shown in FIG. 3 toward its extended position shown in FIG. 1, it is operable to force molten plastic downwardly through the outlet orifice 30 so as to form a downwardly extending tubular parison indicated at 34 in broken lines in FIG. 1.

A hydraulic cylinder assembly 36 has a piston rod 38 connected to the piston 32 for moving the piston 32 downwardly to the position illustrated in FIG. 1

Figure 2:
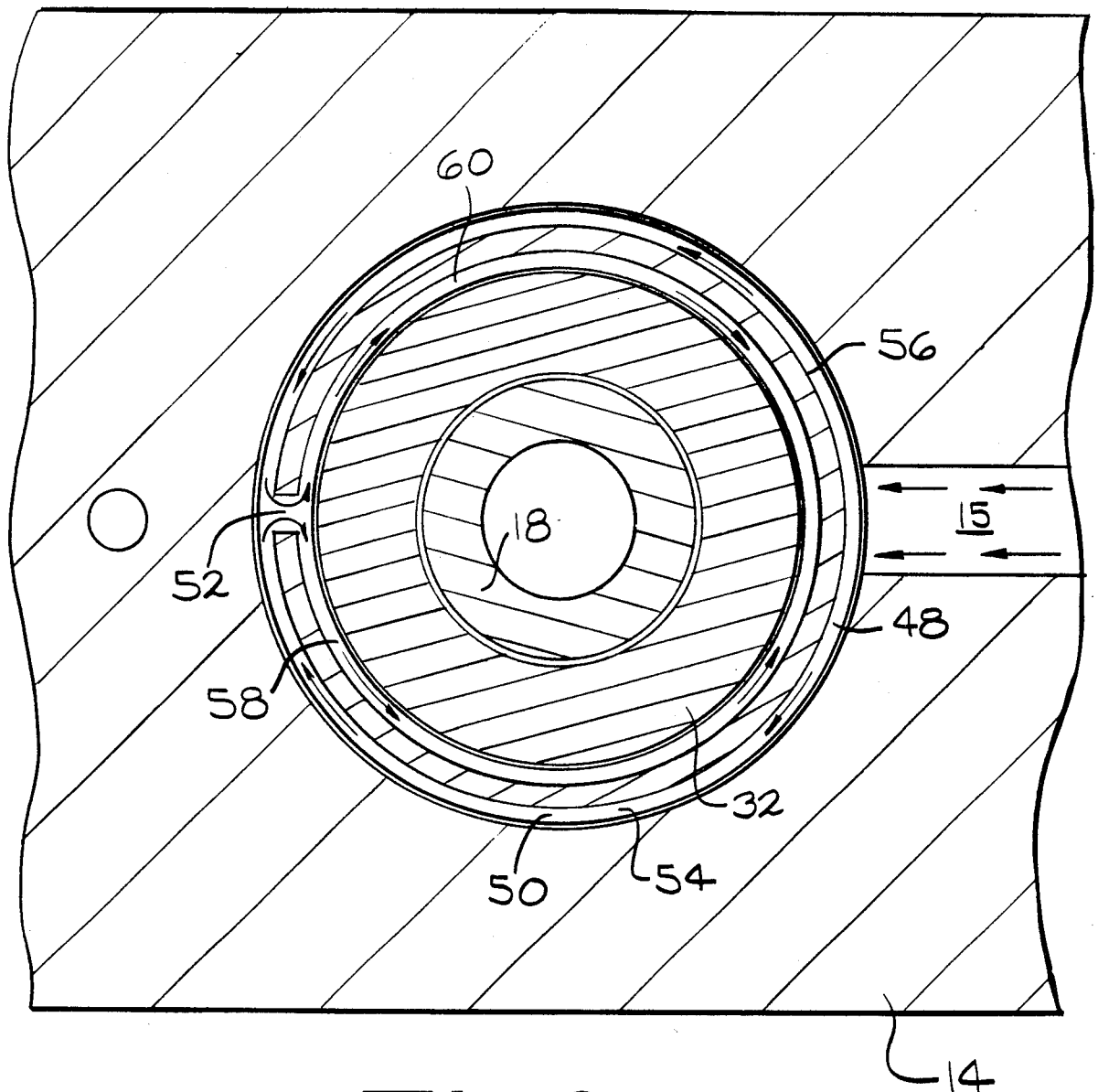
FIG. 2 is a fragmentary enlarged transverse sectional view of the accumulator head of this invention as seen from substantially the line 2—2 in FIG. 1.
Figure 4:
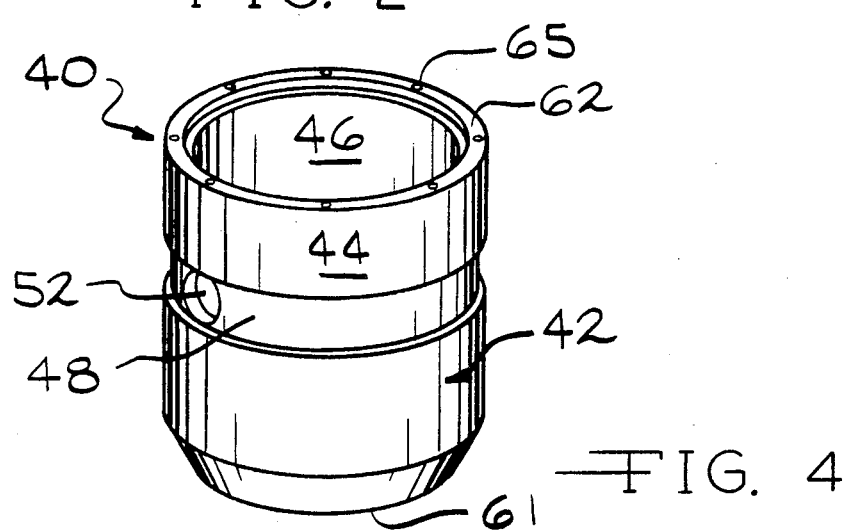
FIG. 4 is a perspective view of the diverter sleeve in the accumulator head of this invention.

A diverter sleeve 40 of the upright tubular shape illustrated in FIG. 4 is mounted in an annular recess 41 in the die body 24 at a position between the inlet passage 15 for molten plastic material and the inlet 26 for the accumulation chamber 28. As shown in FIGS. 2 and 4, the diverter sleeve 40 consists of an upright hollow cylindrical body 42 having an outer cylindrical surface 44 and an inner cylindrical surface 46. A recessed channel 48 is formed in the outer surface 42 so that it is of annular shape and extends completely about the body 42. The inner surface 46 is formed with a similar channel 50 which is located radially opposite the channel 48. A connecting port 52, located diametrically opposite the inlet passage 15, connects the channels 48 and 50.

As a result of the location and construction of the diverter sleeve 40, molten plastic material entering the head 10 from the inlet passage 15 will be split into two arcuate paths 54 and 56 that flow in opposite clockwise and counterclockwise directions, respectively, about the die mandrel 18. These paths meet at the port 52 where the molten plastic from the paths 54 and 56 flows into the channel 50. As the molten plastic flows through the port 52, it is again split into two paths 58 and 60 flowing in counterclockwise and clockwise directions, respectively, about the die mandrel 18. The paths 58 and 60 flow in reverse directions relative to the paths 54 and 56, as shown in FIG. 2.

The paths 58 and 60 again meet at a position substantially radially aligned with the inlet passage 15. During travel of the plastic in the channels 58 and 60, the pressure of the plastic increases by virtue of the endless nature of the paths 54, 56, 58 and 60. As a result plastic is continuously flowing downwardly in more or less annular streams from the channels 48 and 50 to the lower end 61 of the sleeve body 42 and thence into the accumulation chamber inlet 26. The plastic flows around the piston 32 and into the annular inlet 26 for the accumulation chamber 28.

By virtue of the split and overlapping paths 54, 56, 58 and 60, through which the molten plastic is forced to travel, intimate mixing of the plastic is insured and the possibility of the plastic forming a weld line where oppositely traveling portions of the plastic meet around the mandrel 18 is eliminated.

Figure 3:
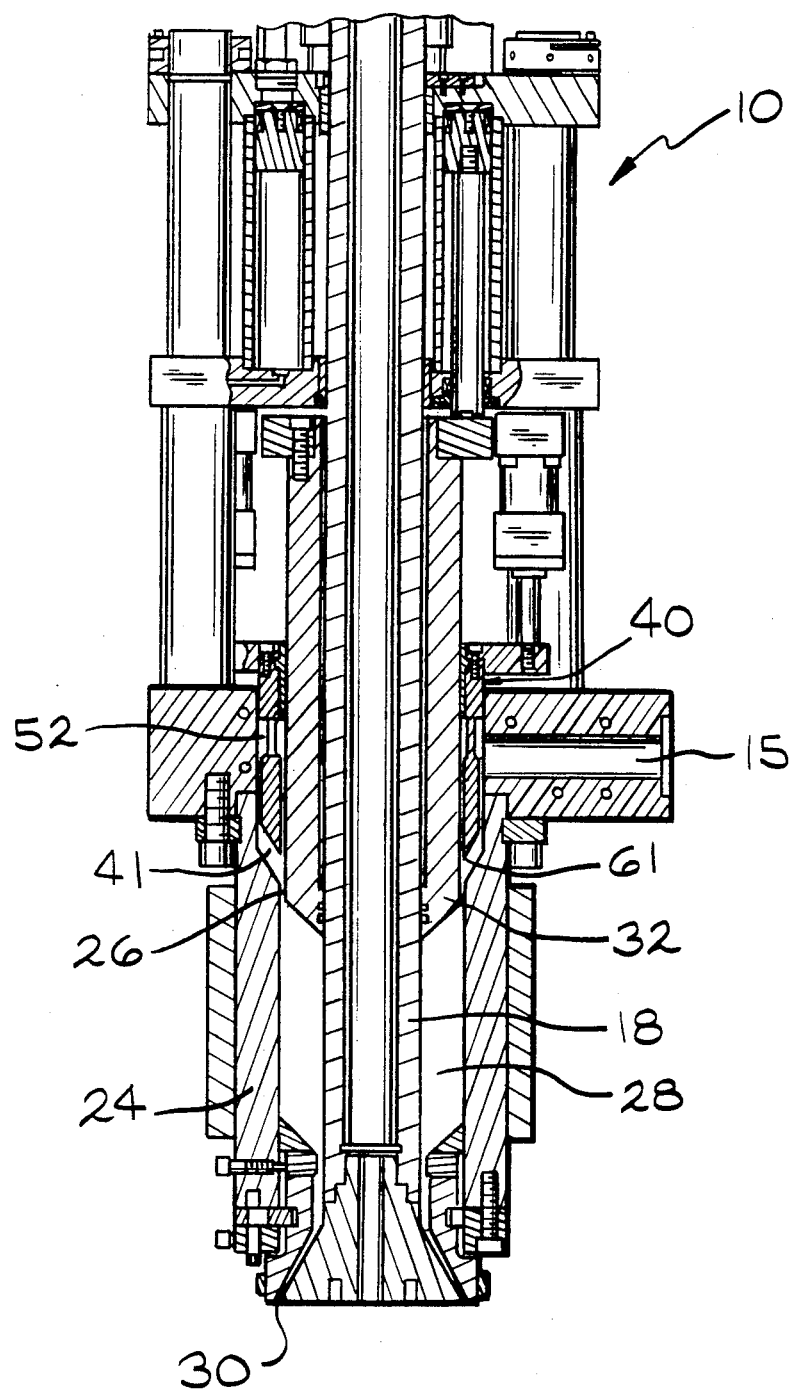
FIG. 3 is a foreshortened fragmentary sectional view of the accumulator head of this invention, like FIG. 1, showing the accumulator piston in its retracted position and also showing the diverter sleeve in a moved position.

The piston 32 is raised from the FIG. 1 position to the retracted position showin in FIG. 3 by the pressure of molten plastic from the diverter sleeve 40 filling the accumulation chamber 28. During filling the fluid pressure in cylinder assembly 36 is relieved so that the resistance of the piston 32 to upward movement is less than the resistance to flow through the restricted orifice 30.

As shown in FIGS. 1 and 3, the upper end 62 of the diverter sleeve body 42 is connected by screws 64 extending into threaded openings 65 in the body 42 to an annular connector plate 66 which is in turn connected to the piston rod 68 for a hydraulic cylinder assembly 70 mounted on the die body 24. The cylinder assembly 70 is operable to move the diverter plate 66 up and down between the lower and upper positions illustrated in FIGS. 1 and 3, respectively. The cylinder assembly 70 can thus be operated during purging of material from the head 10 to move the diverter sleeve 40 up and down to change the flow of material in the head 10 and thus eliminate dead spots. This characteristic of the head 10 dramatically speeds up color changes of plastic material in the head 10 and provides significant savings in down time of the head 10 during changes in material being extruded through the outlet 30.

From the above description, it is seen that this invention provides an improved accumulator head 10 which is operable to improve the quality of folded parts formed from parisons 34 extruded by the head 10 because the parisons 34 will not have the objectionable weld lines caused by converging masses of molten plastic flowing in opposite circumferential directions. In addition, the bead 10 of this invention is advantageous because the diverter sleeve 40 can be moved up and down during purging of the material from the head 10 to faciliate rapid changeover from one material to another in the head 10.

What is claimed is:

1. In an extrusion head, for extruding a tube of plastic material, which includes a die mandrel, a die body enclosing said die mandrel to define therewith an annular outlet orifice, an annular inlet orifice and an annular accumulation chamber in communication with and located between said inlet and outlet orifices, a piston movable in said accumulation chamber so as to discharge accumulated plastic material therein through said outlet orifice, a tubular diverter means supported in said die body exteriorly of said piston and defining with said die body a first flow splitter means and first opposite arcuate flow channels, said diverter defining means for joining said first opposite flow channels, said diverter also defining with said piston means for splitting flow from said means for joining and arcuate channels conducting flow in directions opposite that in said first arcuate channels and connected with annular channel means terminating in said orifice.

2. The structure according to claim 1 wherein said diverter is an upright sleeve member having inner and outer surfaces and an annular outer recessed channel in said outer surface and an annular inner recessed channel in said inner surface at a position radially opposite said outer channel, and a single port connecting said channels at a position substantially diametrically opposite said inlet for plastic material from said extruder.

3. The structure according to claim 2 further including means on said die body connected to said diverter sleeve for selectively moving said diverter sleeve up and down with respect to said inlet from said extruder to eliminate dead points in the plastic flow path in said head.

* * * * *

UNITED STATES PATENT AND TRADEMARK OFFICE
CERTIFICATE OF CORRECTION

PATENT NO. : 4,609,340

DATED : September 2, 1986

INVENTOR(S) : Christopher Irwin et al

It is certified that error appears in the above-identified patent and that said Letters Patent is hereby corrected as shown below:

Column 3, line 5, "28" should read --28--.

Column 4, line 2, "bead" should read -- head --.

Signed and Sealed this

Eleventh Day of November, 1986

Attest:

DONALD J. QUIGG

*Attesting Officer*      *Commissioner of Patents and Trademarks*